(12) United States Patent
Sandoval et al.

(10) Patent No.: US 8,516,596 B2
(45) Date of Patent: Aug. 20, 2013

(54) CYBER ATTACK ANALYSIS

(75) Inventors: Juan E. Sandoval, St. Petersburg, FL (US); Nicholas I. Sapankevych, Clearwater, FL (US); Armando J. Santos, St. Petersburg, FL (US); Suzanne P. Hassell, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 155 days.

(21) Appl. No.: 13/012,888

(22) Filed: Jan. 25, 2011

(65) Prior Publication Data

US 2011/0185432 A1    Jul. 28, 2011

Related U.S. Application Data

(60) Provisional application No. 61/298,495, filed on Jan. 26, 2010.

(51) Int. Cl.
*H04L 29/14* (2006.01)

(52) U.S. Cl.
USPC .......................................................... 726/25

(58) Field of Classification Search
None
See application file for complete search history.

(56) References Cited

U.S. PATENT DOCUMENTS

| | | | |
|---|---|---|---|
| 5,850,516 A * | 12/1998 | Schneier | 726/25 |
| 7,013,395 B1 * | 3/2006 | Swiler et al. | 726/25 |
| 7,194,769 B2 * | 3/2007 | Lippmann et al. | 726/25 |
| 7,676,841 B2 | 3/2010 | Sobchuk et al. | |
| 7,756,933 B2 | 7/2010 | Reshef et al. | |
| 2006/0021050 A1 * | 1/2006 | Cook et al. | 726/25 |
| 2007/0016955 A1 * | 1/2007 | Goldberg et al. | 726/25 |
| 2008/0222731 A1 * | 9/2008 | Dowd et al. | 726/25 |

OTHER PUBLICATIONS

Kotenko et al., Attack Graph Based Evaluation of Network Security, IFIC, 2006, pp. 216-227.*
Cui et al., Network Security Simulation and Evaluation, ACM, 2008, pp. 55-58.*
Gorodetsky et al., Multi-Agent Modeling and Simulation of Distributed Denial-of-Service Attacks on Computer Networks, Third Int. Conf. on Navy and Shipbuilding Nowadays, 2003.*
Moitra et al., A Simulation Model for Managing Survivability of Networked Information Systems, Carnegie Mellon, 2000, pp. 1-26.*
Sarraute et al., Simulation of Computer Network Attacks, Corelabs, 2007.*
Chi et al., Network Security Modeling and Cyber Attacks Simulation Methodology, Springer-Verlag, 2001, pp. 320-333.*
Kuhl et al., Cyber Attack Modeling and Simulation for Network Security Analysis, IEEE, 2007, pp. 1180-1188.*
Ourston et al., Application of Hidden Markov Models to Detecting Multi-stage Network Attack, IEEE, 2003.*
Sperotto et al., Hidden Markov Model Modeling of SSH Brute-Force Attacks, 2009.*

* cited by examiner

*Primary Examiner* — Minh Dinh
(74) *Attorney, Agent, or Firm* — Schwegman Lundberg & Woessner, P.A.

(57) ABSTRACT

In certain embodiments, analyzing cyber attacks includes receiving cyber attack parameters. A cyber attack parameter describes a performance attribute of a cyber attack scenario. The cyber attack parameters comprises at least one temporal parameter describing a temporal feature of the cyber attack scenario. The following is performed for each cyber defense of one or more cyber defenses to yield one or more sets of cyber attack metrics: simulating the cyber attack operating with a cyber defense; and determining a set of cyber attack metrics describing the cyber attack operating with the cyber defense. The cyber defenses are evaluated in accordance with the sets of cyber attack metrics.

29 Claims, 4 Drawing Sheets

CYBER ATTACK ANALYSIS

RELATED APPLICATION

This application claims benefit under 35 U.S.C. §119(e) of U.S. Provisional Application Ser. No. 61/298,495, entitled "Cyber-Attack Analysis System," filed Jan. 26, 2010, by Juan E. Sandoval et al., which is incorporated herein by reference.

TECHNICAL FIELD

This invention relates generally to the field of computer networks and more specifically to cyber attack analysis.

BACKGROUND

Computer networks may provide a framework architecture for information sharing and workload distribution among computing systems. Due to the extensible structure of certain computer networks, cyber attacks may be a problem. Computer security may protect computer networks from certain types of attacks.

SUMMARY OF THE DISCLOSURE

In accordance with the present invention, disadvantages and problems associated with previous techniques for analyzing cyber attacks may be reduced or eliminated.

In certain embodiments, analyzing cyber attacks includes receiving cyber attack parameters. A cyber attack parameter describes a performance attribute of a cyber attack scenario. The cyber attack parameters comprise at least one temporal parameter describing a temporal feature of the cyber attack scenario. The following is performed for each cyber defense of one or more cyber defenses to yield one or more sets of cyber attack metrics: simulating the cyber attack operating with a cyber defense; and determining a set of cyber attack metrics describing the cyber attack operating with the cyber defense. The cyber defenses are evaluated in accordance with the sets of cyber attack metrics.

Certain embodiments of the invention may provide one or more technical advantages. A technical advantage of one embodiment may be that cyber attack parameters that describe a cyber attack scenario may be used to determine cyber attack metrics. The cyber attack metrics may be used to determine the effectiveness of a cyber attack defense on a cyber attack. Another technical advantage of one embodiment may be that a cyber attack metric may take into account one or more temporal cyber attack parameters. A temporal cyber attack parameter may be a more accurate way to determine the effectiveness of a cyber attack defense on a cyber attack.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
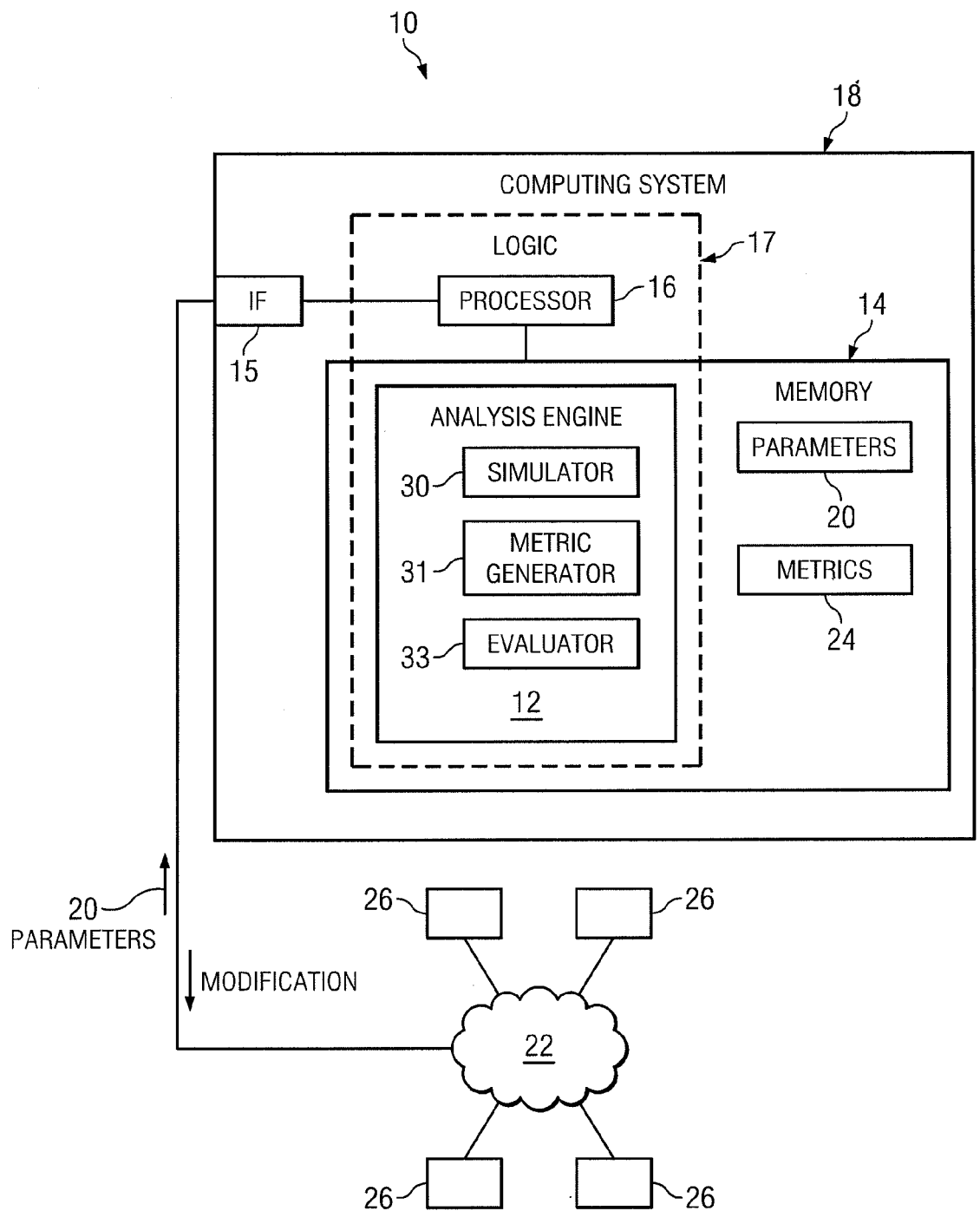
FIG. 1 illustrates one embodiment of a cyber attack analysis system according to the teachings of the present disclosure.

FIG. 1 illustrates one embodiment of a cyber attack analysis system 10 according to the teachings of the present disclosure. Cyber attack analysis system 10 includes a cyber attack analysis engine 12 stored in a memory 14 and executed by one or more processors 16 of a computing system 18. Computer network 22 includes and/or communicates with computing systems 26. Cyber attack analysis engine 12 uses cyber attack parameters 20 that describe a cyber attack scenario to generate one or more cyber attack metrics 24.

In certain embodiments, cyber attack analysis engine 12 includes a simulator 30 that simulates a cyber attack and a cyber defense operating in computer network 22 to yield cyber attack metrics 24. Metrics 24 may be used to evaluate the effectiveness of a cyber defense against a cyber attack. In certain embodiments, cyber attack analysis engine 12 includes evaluator 33 that evaluates the effectiveness of different cyber defenses.

In certain embodiments, computer network 22 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

A computer network 22 may be managed by an organization with facilities that span one or more regions. Computer network 22 may incorporate other networks that each provide information sharing among one or more computing systems 26 and a virtual network that is layered over a public network, such as the Internet, to provide data connectivity among the networks. Certain computer networks 22 may be susceptible to cyber attack due to a relatively close association with publicly accessible networks.

A cyber attack may be an attack on computers and/or information on the computers caused by malicious computer code. For example, a cyber attack may alter, disrupt, steal, deny, degrade, and/or destroy the computers and/or information. A cyber defense is designed to reduce the effect of and/or prevent the cyber attack. For example, detecting an attack may be a defense.

Figure 2:
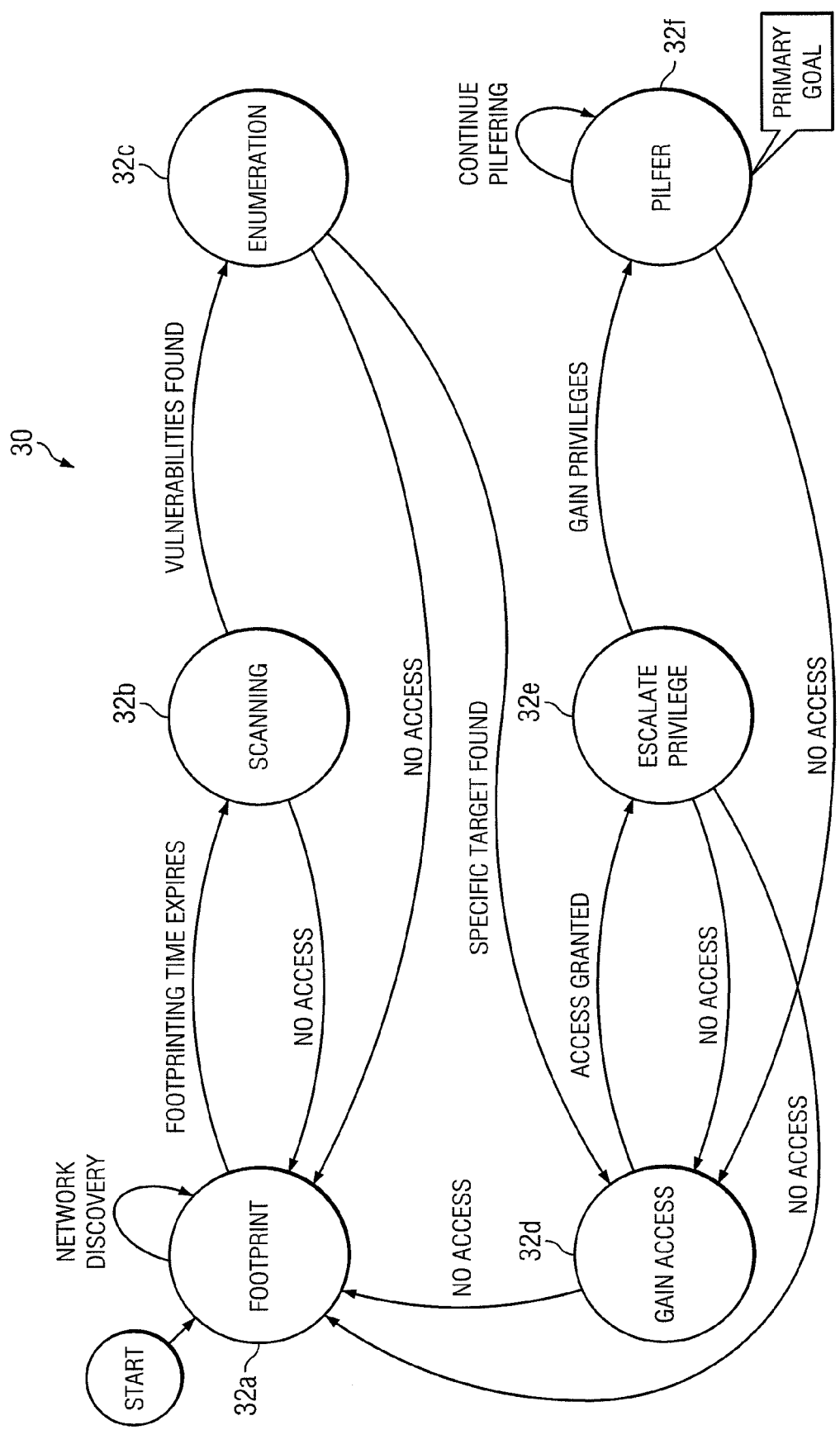
FIG. 2 illustrates a state diagram of an example of the phases of a cyber attack according to the teachings of the present disclosure.

In certain embodiments, a cyber attack has one or more phases. FIG. 2 illustrates a state diagram of an example of the phases of a cyber attack. In the example, the cyber attack is a hacking process 30. Hacking process 30 may include a footprint phase 32a, a scanning phase 32b, an enumeration phase 32c, a gain access phase 32d, an escalate privilege phase 32e, and/or a pilfer phase 32f, and progresses sequentially from footprint phase 32a to pilfer phase 32f. If a phase is reached where a cyber defense prevents access, the attack may revert to a previous phase or an initial phase such as footprint phase 32a.

Returning to FIG. 1, cyber defenses include reactive and preemptive cyber defenses. A reactive defense takes action in response to the initiation of a cyber attack. A preemptive defense operates on computer system 22 prior to initiation of a cyber attack. Examples of preemptive cyber defenses are described in U.S. patent application Ser. No. 12/688,607, titled "System, Method, and Software for Maneuvering Computing Elements in a Distributed Computing Environment," filed on Jan. 19, 2010, which is hereby incorporated by reference in its entirety; U.S. patent application Ser. No. 12/688,642, titled "System, Method, and Software for Maneuvering Computing Elements in a Distributed Computing Environment," filed on Jan. 19, 2010, which is hereby incorporated by reference in its entirety; and U.S. patent application Ser. No. 12/688,663, titled "System, Method, and Software for Maneuvering Computing Elements in a Distributed Computing Environment," filed on Jan. 19, 2010, which is hereby incorporated by reference in its entirety.

In the illustrated example, system 10 includes a computing system 18 with an interface 15, logic 17, and a memory 14. Logic 17 includes one or more processors 16 and applications such as an analysis engine 12, which includes a simulator 30, a metric engine 31, and an evaluator 33. Memory stores logic 17 and parameters 20 and metrics 24.

Cyber attack parameters 20 may be received from computer network 22 and/or calculated by computer system 18. A cyber attack parameter 20 may describe one or more features of a cyber attack scenario. A cyber attack scenario may include a cyber attack, computer network 22 that may be attacked by the cyber attack, and/or a cyber defense defending computer network 22 against the cyber attack. A cyber attack parameter 20 may have one or more values that may be used to calculate a metric. For example, a parameter may include a value that may be used in the mathematical function of a cyber attack metric 24 to calculate the metric.

Cyber attack parameters 20 may include any suitable parameters, such as parameters that describe a cyber attack and/or computer network 22. Examples of parameters that describe a cyber attack include the number of attack phases, number of successful attacks, number of partially successful attacks, and total number of attacks. Examples of parameters that describe a cyber defense include the number of disruptions on an attack and number of defensive actions taken. Examples of parameters that describe computer network 22 include the number of virtual and/or physical machines and size of computer network 22.

In certain embodiments, a cyber attack parameter 20 may be a temporal parameter that describes a temporal feature of a cyber attack scenario. A temporal feature may describe a duration, such as the preemptive defense interval, duration of a phase of an attack, time spent by an attack on a phase, and nominal attack duration. A temporal feature may describe a time (such as clock time, day, or date) of an event, such as the time that an attack, attack phase, or defense occurs.

In certain embodiments, a temporal cyber attack parameter may provide insight into the effectiveness of a cyber defense. For example, a cyber defense may attempt to increase cost to the attacker, increase uncertainty of successful attack, and/or increase probability of detection and/or attribution. The cost may increase as the number of times a particular phase of the cyber attack is thwarted increases and/or the amount of time spent in the preparatory phases of a cyber attack (such as phases leading up to pilfer phase 32f) increases. The uncertainty may increase as the amount of time a cyber attack spends executing its goal (such as the time spent in the pilfer phase 32f) decreases. The probability of detection may increase as the time required for an attack to reach and execute its goal increases or the frequency of attack activity increases, enabling the attack to be more readily detected.

A cyber attack metric 24 may be used to measure features of a cyber attack. In certain embodiments, cyber attack metric 24 may indicate the effect that the attack is having on computer network 22. In the embodiments, the effectiveness of one or more cyber defenses may be determined by measuring one or more cyber attack metrics 24. For example, scenarios may be run, each with a different cyber defense responding to a cyber attack. Cyber attack metrics 24 of a particular scenario indicate the effect of the cyber attack with a particular cyber defense. In one example, a cyber defense that reduces the effect of the cyber attack on network 22 may be regarded as a more effective defense. As another example, scenarios may be run, each with a cyber defense responding to a different cyber attack. Cyber attack metrics 24 indicate the effectiveness of a cyber defense against different cyber attacks.

In certain embodiments, a cyber attack metric may have a mathematical function that can be applied to one or more values to yield the metric. Examples of cyber attack metrics 24 are described in more detail below.

Metrics may be used to measure the effectiveness of a cyber defense in any suitable manner. In certain embodiments, a more effective cyber defense may have a higher (or lower) value than a less effective cyber defense. For example, a more effective cyber defense may let fewer attacks occur than a less effective cyber defense may allow. For instance, the more effective cyber defense may let x attacks out of a total of T attacks occur, and the less effective cyber defense may let x+1 attacks occur, where x=1, 2, 3, . . . , and x≦T.

In certain embodiments, cyber attack metrics 24 may provide an industry defined standard or benchmark for measuring the effects of cyber attacks on computer network 22, operation of the cyber attacks, and/or response of computer network 22 to cyber attacks. Information for protecting the security computer networks 22 from cyber attack metrics 24 may be obtained.

In certain embodiments, cyber attack analysis engine receives one or more cyber attack parameters that describe a cyber attack of a cyber attack scenario. The cyber attack parameters comprise at least one temporal parameter describing a temporal feature of the cyber attack scenario. Cyber attack analysis engine 12 performs the following for each cyber defense of one or more cyber defenses to yield one or more sets of cyber attack metrics: simulating the cyber attack operating with a cyber defense and determining a set of cyber attack metrics describing the cyber attack operating with the cyber defense. Cyber attack analysis engine 12 evaluates the cyber defenses in accordance with the one or more sets of cyber attack metrics.

Simulator 30 may perform the simulation and may comprise any suitable simulation software or tool. Examples of simulators include OPNET, Matlab, Simulink, Extend, or other simulation software or tool. In certain embodiments, simulator 30 may use cyber attack parameters 20 to run a simulation, and may output cyber attack parameters 20 and/or cyber attack metrics 24.

Metric generator 31 may generate cyber attack metrics 24 from any suitable input, such as cyber attack parameters 20 and/or other cyber attack metrics 24. Any suitable metrics may be generated in any suitable manner as discussed below.

A successful attack metric may measure the success of a cyber attack. A successful attack may be defined as one that accomplishes its goal, for example, successfully reaches and completes a goal phase, such as pilfer phase 32f. In this type of successful attack, the attacker may find one or more items of interest during an early, such as the first, pilfering attempt. In certain embodiments, a more effective cyber defense may allow for fewer successful attacks than that allowed by a less effective cyber defense.

In certain embodiments, the success may be measured using the number of successful attacks. For example, a percent of successful attacks metric measures the percent of successful attacks. In certain embodiments, a percent of successful attacks metric $p_{A,success}$ may be given by the success following:

$$p_{A,success} = \frac{N_{A,success}}{N_{A,total}} \times 100\%$$

where:
$p_{A,success}$ percent of successful attacks;
$N_{A,success}$ number of successful attacks; and
$N_{A,total}$ total number of attacks.

A partially successful attack metric may measure the ability of a cyber attack to defeat boundary defenses and/or have access to and/or control of network 22. A partially successful attack may one that executes one or more phases 32 up to, but not including, the goal phase, such as pilfer phase 32f. In certain embodiments, a more effective cyber defense may allow for fewer partially successful attacks than that allowed by a less effective cyber defense.

In certain embodiments, partial success may be measured using the number of partially successful attacks. For example, a percent of partially successful attacks metric measures the percent of partially successful attacks. In certain embodiments, a percent of partially successful attacks metric $p_{A,partial}$ may be given by the following:

$$p_{A,partial} = \frac{N_{A,partial}}{N_{A,total}} \times 100\%$$

where:
$P_{A,partial}$ percent of partially successful attacks;
$N_{A,partial}$ number of partially successful attacks; and
$N_{A,total}$ number of total attacks observed.

An attack disruptions metric may be used to measure the effectiveness of a defense of computer network 22. An attack disruption may be any effect of a defense that impedes the progress of a cyber attack. In certain embodiments, a more effective cyber defense may have more attack disruptions than that of a less effective cyber defense.

The number of attack disruptions may depend on the length of time the cyber attack is observed. In certain embodiments, the observation time may be the same for each cyber defense. If the observations times are not the same, the observation times may be normalized.

The number of attack disruptions may be correlated to the number of defensive actions. If the defensive actions are preemptive, the number may be correlated to the periodicity of defensive actions. If the defensive actions are reactive, the number may be correlated to the probability of attack prevention.

In certain embodiments, a mean number of attack disruptions metric measures the mean number of disruptions per attack. In the embodiments, a mean number of attack disruptions metric $\overline{N}_{disruption}$ may be expressed by the following:

$$\overline{N}_{disruption} = \frac{\sum_{i=1}^{N_{A,total}} N_{i,disruption}}{N_{A,total}}$$

where:
$\overline{N}_{disruption}$ mean number of disruptions per attack;
$N_{i,disruption}$ number of disruptions on the $i^{th}$ attack; and
$N_{A,total}$ number of total attacks observed.

A time metric measures the amount of time an attack spends in one or more phases. A more effective defense may increase the amount of time. A cyber attack's timing profile can be characterized by the amount of time the attack spends in each phase 32. In certain embodiments, a more effective cyber defense may be associated with a greater time spent in the preliminary phases 32 (for example, footprint phase 32a and/or scanning phase 32b) than that associated with a less effective cyber defense.

In certain embodiments, time spent per phase metric $T_{phases}$ may be expressed by the following:

$$T_{phases} = (t_1, t_2, \ldots, t_N)$$

where:
$T_{phases}$ vector of phase times;
N number of attack phases; and
$t_n$ time spent on the $n^{th}$ phase of an attack,
where:

$$t_n = \sum_{i=1}^{N_{A,total}} t_{i,n}$$

for cumulative time;

$$t_n = \frac{\sum_{i=1}^{N_{A,total}} t_{i,n}}{\sum_{j=1}^{N} t_j} \times 100\%$$

for percent mean time; and $$t_n = \frac{\sum_{i=1}^{N_{A,total}} t_{i,n}}{N_{A,total}}$$

for mean phase-time,
where:
$t_{i,n}$ time spent by the $i^{th}$ attack on the $n^{th}$ phase;
$t_n$ time spent on the $n^{th}$ phase of an attack;
$t_j$ time spent on the $j^{th}$ phase of an attack;
$N_{A,total}$ number of total attacks observed; and
N number of attack phases.

A duration metric may measure the duration of an attack, such as a successful attack. For example, a duration of a successful attack metric may measure the execution time from the first phase (such as footprint phase 32a) to the last phase (such as pilfer phase 32f). The execution time may include one or more revisits to one or more intermediate phases (such as scanning phase 32b, enumeration phase 32c, gain access phase 32d, and/or escalate phase 32e). The revisits may be due to either a cyber attack or cyber defense. The mean time may be computed from multiple observations. In certain embodiments, a more effective cyber defense may be associated with a longer duration of an attack than that associated with a less effective cyber defense.

In certain embodiments, a duration of successful attack metric $\bar{t}_{A,success}$ may be expressed by the following:

$$\bar{t}_{A,success} = \frac{1}{N_S} \sum_{j \in S} \sum_{i=1}^{N} t_{j,i}$$

where:
$\bar{t}_{A,success}$ mean execution time of an attack;
$t_{j,i}$ time spent by the $j^{th}$ attack on the $i^{th}$ phase;
N number of attack phases;
S set of successful attacks (a total of $N_{A,success}$); and
$N_S$ number of attacks that are members of S.

An efficiency metric may measure the efficiency of a defense against an attack. For example, a defensive efficiency metric measures how often a cyber attack is disrupted versus how often defensive action is taken. If a cyber attack succeeds, the defensive efficiency may be considered to be zero. For preemptive defenses, the defensive efficiency ranges from 0 to 100 percent. For reactive defensives, efficiency may be greater than or equal to 100 percent. In certain embodiments, a more effective cyber defense may have a higher efficiency of a defense against an attack than that of a less effective cyber defense.

In certain embodiments, a defensive efficiency metric $\eta_{defense}$ may be expressed by the following:

$$\eta_{defense} = \frac{N_{A,total} - N_{A,success}}{N_D} \times 100\%$$

where:
$\eta_{defense}$ defensive efficiency;
$N_{A,total}$ number of total attacks;
$N_{A,success}$ number of successful attacks; and
$N_D$ number of defensive actions taken.

A defense factor metric may measure of the relative speed of execution between a defense and an attack. As the rate of preemptive defense actions increases (for example, the interval between actions decrease), the probability that a cyber attack succeeds decreases.

In certain embodiments, a defense factor metric D may be expressed by the following:

$$D = \frac{t_D}{t_{A,nominal}}$$

where:
D defense factor;
$t_D$ preemptive defense interval; and
$t_{A,nominal}$ nominal attack duration.

A utilization metric may measure utilization of one or more resources, such as virtual and/or physical resources. The metric may measure utilization in any suitable manner. In certain embodiments, a virtual utilization metric measures how many logical processes are used by a physical resource. For example, a virtual utilization metric may measure the ratio of the number of virtual machines to the number of core processors of a physical machine. A utilization metric may be averaged across a network.

An attack noise metric may measure recurring operations (or noise) typically performed by a cyber attack. The metric may measure the number and/or rate of the recurring operations. In certain embodiments, an attack noise metric may relate execution time to attack noise. Different measurements may be used for different phases. For example, pings per second may be used for the footprinting phase 32*a*, port scans per second may be used for scanning phase 32*b* or enumeration phase 32*c*, or password authentication attempts per minute may be used for the gain access phase 32*d*.

Greater noise may make an attack easier to detect, as the noise may become an observable outlier from the system's normal operation. Accordingly, a cyber defense may attempt to increase a cyber attack's noise. For example, a cyber defense may compress the window of opportunity an attack has to execute (for example, perform attack time dilation) to force the attack to perform more operations in less time.

A size metric may measure the size of computer network 22. For example, an effective surface area metric measures the effective surface area of computer network 22. In general, the larger a system is, the more susceptible it may be to attack. Accordingly, a cyber defense may attempt to obscure at least a portion of computer network 22. For example, a cyber defense may attempt to obscure at least a portion of the effective surface area of computer network 22.

Evaluator 33 may evaluate the cyber defenses in accordance with the sets of cyber attack metrics. The cyber defenses may be evaluated in any suitable manner. For example, first and second successful attacks metrics may measure the number of successful attacks with a first and second cyber defense, respectively. The metrics may indicate that the first cyber defense has fewer successful attacks than the second cyber defense has or reduces successful attacks better than the second cyber defense does. The first cyber defense may be regarded as more effective than the second cyber defense.

As another example, first and second partially successful attacks metrics may measure the number of partially successful attacks with first and second cyber defenses, respectively. The metrics may indicate that the first cyber defense has fewer partially successful attacks than the second cyber defense has or reduces partially successful attacks better than the second cyber defense does. The first cyber defense may be regarded as more effective than the second cyber defense.

As another example, first and second duration metrics may measure the duration of the cyber attack with first and second cyber defenses, respectively. The metrics may indicate that that the first cyber defense has a longer duration of cyber attack than the second cyber defense has. The first cyber defense may be regarded as more effective than the second cyber defense.

As another example, first and second attack disruptions metrics may measure the number of attack disruptions with first and second cyber defenses, respectively. The metrics may indicate that that the first cyber defense yields more attack disruptions than the second cyber defense yields. The first cyber defense may be regarded as more effective than the second cyber defense.

As another example, first and second phase time metrics may measure the amount of time an attack spends in a particular phase with first and second cyber defenses, respectively. The metrics may indicate that that the first cyber defense makes the cyber attack spend more time in one or more target phases more than the second cyber defense. A target phase may be an earlier phase or a phase targeted by the defense. The first cyber defense may be regarded as more effective than the second cyber, defense.

As another example, first and second efficiency metrics may measure a ratio of how often the cyber attack is disrupted versus how often a defensive action is taken with first and second cyber defenses, respectively. The metrics may indicate that the first cyber defense has a greater ratio than the second cyber defense has. The first cyber defense may be regarded as more effective than the second cyber defense.

As another example, first and second defense metrics may measure a relative speed of execution between the cyber attack and first and second cyber defenses, respectively. The metrics may indicate that that the first cyber defense has a shorter relative speed than the second cyber defense has. The first cyber defense may be regarded as more effective than the second cyber defense.

In certain embodiments, a defense may be re-evaluated using different time parameters. As an example, a defense run at different times may be considered separate defenses.

Analysis engine 12 may perform other operations. For example, analysis engine 12 may modify computer network 12 in response to metrics 24. The modifications may be performed automatically or by a user and may be performed by sending instructions to computer network 22 to implement the modifications.

The modifications may be performed in any suitable manner. The structure and/or operation of computer network 22 may be modified to yield metrics 24 that indicate a more secure computer network 22. In certain embodiments, certain activities on computer network 22 may be limited and/or regulated. For example, certain types of data transmission over computer network 22 may be limited according to the sensitivity and/or susceptibility of the data. As another example, firewalls or other security devices may be added or enhanced. As another example, computer network 22 may be modified by randomly maneuvering a network element of the computer network to another computer of the computer network.

Figure 3:
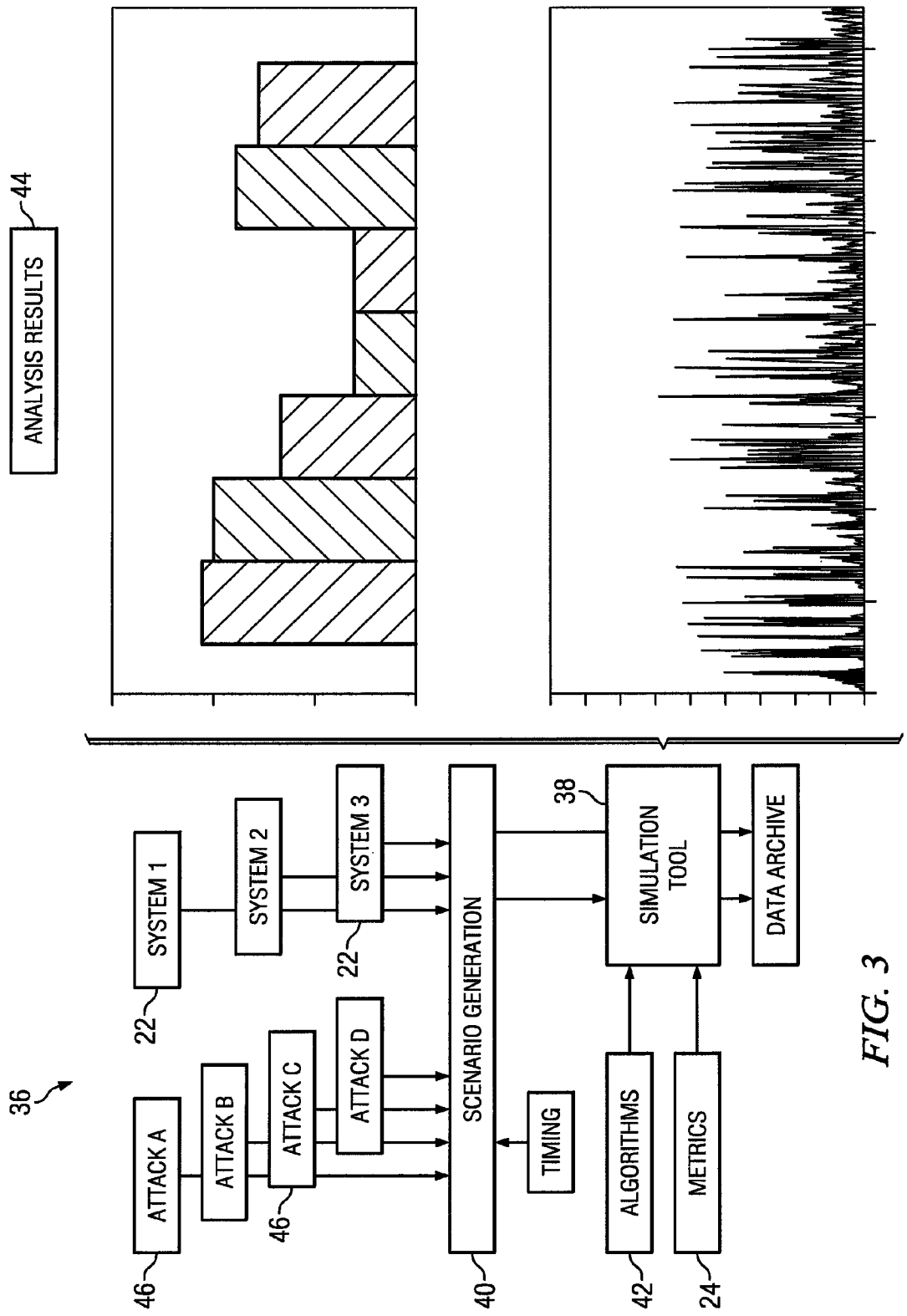
FIG. 3 illustrates an example of an analysis framework that may be used to model cyber attacks according to the teachings of the present disclosure.

FIG. 3 illustrates an example of an analysis framework 36 that may be used to model cyber attacks 46 on computer networks 22. Analysis framework 36 includes a simulation tool 38 that receives information from a scenario generator 40, one or more algorithms 42, and one or more cyber attack metrics 24 to determine results 44 that describe the effect of cyber attacks 46 on computer networks 22. In one embodiment, cyber attacks 46 may be regarded as independent. In certain embodiments, statistics for the cyber attacks and/or defenses may be aggregated to yield cyber attack metrics 24.

Figure 4:
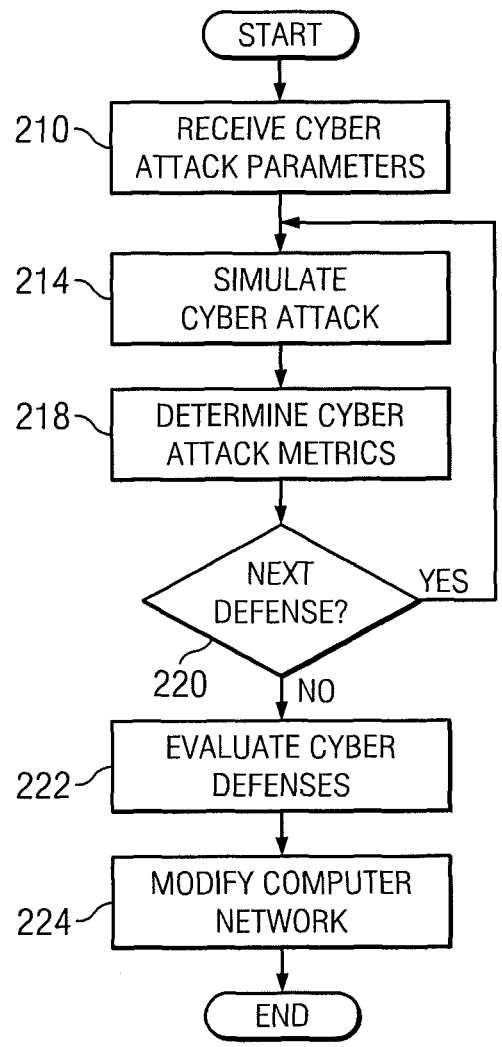
FIG. 4 illustrates an example of a method that may be performed by an analysis engine according to the teachings of the present disclosure.

FIG. 4 illustrates an example of a method that may be performed by analysis engine 12. One or more cyber attack parameters are received at step 210. A cyber attack parameter describes a cyber attack of a cyber attack scenario. The cyber attack parameters comprise at least one temporal parameter describing a temporal feature of the cyber attack scenario.

Steps 214 and 218 are performed for each of one or more cyber defenses to yield one or more sets of cyber attack metrics. In certain embodiments, steps 214 and 218 are performed with no cyber defense to obtain one or more baseline cyber attack metrics describing a scenario in which no cyber defense operates.

The cyber attack operating with a cyber defense is simulated using the cyber attack parameters at step 214. A set of cyber attack metrics describing the cyber attack operating with the cyber defense is determined at step 218. The metrics may indicate the effectiveness of each cyber defense against the cyber attack. There may be a next cyber defense at step 220. If there is a next cyber defense, the method returns to step 214 to simulate the next cyber defense. If there is no next cyber defense, the method proceeds to step 222.

The cyber defenses are evaluated in accordance with the sets of cyber attack metrics at step 222. A cyber defense with metrics indicating that the defense is the most effective may be identified.

Computer network 22 is modified at step 224. In certain embodiments, computer network 22 may be modified by identifying and sending the most effective cyber defense to computer network 22. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of metric generator 31 and evaluator 33 may be performed by one component, or the operations of metric generator 31 may be performed by more than one component. Additionally, operations of the systems and apparatuses may be performed using any suitable logic comprising software, hardware, and/or other logic. Components of the systems and apparatuses may be coupled by any suitable communication network. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/ or encoded with a computer program and/or having a stored and/or an encoded computer program.

A memory stores information. A memory may comprise one or more non-transitory, tangible, computer-readable, and/ or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving one or more cyber attack parameters, a cyber attack parameter describing a cyber attack scenario, the cyber attack parameters comprising at least one temporal parameter describing a temporal feature of the cyber attack scenario and a plurality of attack phases of the cyber attack scenario;
performing the following for each cyber defense of one or more cyber defenses to yield one or more sets of cyber attack metrics:
simulating the cyber attack scenario operating with a cyber defense, the simulation including: simulating a first attack phase of the cyber attack scenario against the cyber defense, and in response to the cyber attack overcoming the first cyber defense, simulating another of the plurality of attack phases of the cyber attack against the cyber defense; and
determining a set of cyber attack metrics describing the cyber attack scenario operating with the cyber defense in each attack phase of the cyber attack scenario, the set of cyber attack metrics including a phase time metric that measures the amount of time the cyber attack spends in each attack phase of the plurality of attack phases of the cyber attack scenario with the cyber defense; and
evaluating the one or more cyber defenses in accordance with the one or more sets of cyber attack metrics in each of the plurality of attack phases of the cyber attack scenario.

2. The method of claim 1, further comprising:
simulating the cyber attack operating with no cyber defense; and
determining, prior to simulating the cyber attack scenario operating with a cyber defense, a baseline set of cyber attack metrics describing the cyber attack operating with no cyber defense.

3. The method of claim 1, further comprising:
identifying an effective cyber defense from the one or more cyber defenses in response to the evaluating of the one or more cyber defenses; and
in response to identifying the effective cyber defense modifying a computer network using the effective cyber defense.

4. The method of claim 1:
the determining the set of cyber attack metrics comprising:
determining a first successful attacks metric that measures the number of successful attacks with a first cyber defense; and
determining a second successful attacks metric that measures the number of successful attacks with a second cyber defense, the first successful attacks indicating that the first cyber defense reduces the number of successful attacks more than the second cyber defense; and
the evaluating the one or more cyber defenses comprising:
determining that the first cyber defense is more effective than the second cyber defense based at least in part on the first successful attack metric and the second successful attack metric.

5. The method of claim 1:
the determining the set of cyber attack metrics comprising:
determining a first partially successful attacks metric that measures the number of attack phases that are overcome by the cyber attack scenario with a first cyber defense; and
determining a second partially successful attacks metric that measures the number of attack phases that are overcome by the cyber attack scenario with a second cyber defense; and
the evaluating the one or more cyber defenses comprising:
determining that the first cyber defense is more effective than the second cyber defense based at least in part on the first partially successful attack metric and the second partially successful attack metric.

6. The method of claim 1:
the determining the set of cyber attack metrics comprising:
determining a first duration metric that measures the duration of the cyber attack with a first cyber defense; and
determining a second duration metric that measures the duration of the cyber attack with a second cyber defense, the first duration metric indicating that the first cyber defense is of a greater duration of the cyber attack than that of the second cyber defense; and
the evaluating the one or more cyber defenses comprising:
determining that the first cyber defense is more effective than the second cyber defense based at least in part on a comparison of the first duration metric and the second duration metric.

7. The method of claim 1:
the determining the set of cyber attack metrics comprising:
determining a first attack disruptions metric that measures the number of attack disruptions with a first cyber defense; and
determining a second attack disruptions metric that measures the number of attack disruptions with a second cyber defense; and
the evaluating the one or more cyber defenses comprising:
determining that the first cyber defense is more effective than the second cyber defense based at least in part on a comparison of the first attack disruptions metric and the second attack disruptions metric.

8. The method of claim 1:
the evaluating the one or more cyber defenses comprising:
determining that the first cyber defense is more effective than the second cyber defense based at least in part on a comparison of the phase time metric for the first cyber defense and the phase time metric for the second cyber defense.

9. The method of claim 1:
the determining the set of cyber attack metrics comprising:
determining a first efficiency metric that measures a ratio of how often the cyber attack is disrupted versus how often a defensive action is taken with a first cyber defense; and
determining a second efficiency metric that measures a ratio of how often the cyber attack is disrupted versus how often a defensive action is taken with a second cyber defense, the first efficiency metric indicating that the first cyber defense has a higher ratio than that of the second cyber defense; and
the evaluating the one or more cyber defenses comprising:
determining that the first cyber defense is more effective than the second cyber defense.

10. The method of claim 1:
the determining the set of cyber attack metrics comprising:
determining a first duration metric that measures a relative speed of execution between the cyber attack and a first cyber defense; and
determining a second duration metric that measures a relative speed of execution between the cyber attack and a second cyber defense, the first duration metric indicating that the first cyber defense having a higher relative speed than that of the second cyber defense; and
the evaluating the one or more cyber defenses comprising:
determining that the first cyber defense is more effective than the second cyber defense.

11. The method of claim 1, the set of cyber attack metrics comprising:
a utilization metric that measures utilization of one or more resources.

12. The method of claim 1, the set of cyber attack metrics comprising:
an attack noise metric that measures one or more recurring cyber attack operations.

13. The method of claim 1, the set of cyber attack metrics comprising:
a size metric that measures the size of a computer network of the cyber attack scenario.

14. A system comprising:
one or more memories operable to store one or more cyber attack parameters, a cyber attack parameter describing a cyber attack scenario, the cyber attack parameters comprising at least one temporal parameter describing a temporal feature of the cyber attack scenario; and
one or more processors operable to:
perform the following for each cyber defense of one or more cyber defenses to yield one or more sets of cyber attack metrics:
simulate the cyber attack scenario operating with a cyber defense, the simulation including: simulating a first attack phase of the cyber attack scenario against the cyber defense, and in response to the cyber attack overcoming the first cyber defense, simulating another of the plurality of attack phases of the cyber attack against the cyber defense; and
determine a set of cyber attack metrics describing the cyber attack scenario operating with the cyber defense in each attack phase of the cyber attack scenario, the set of cyber attack metrics including a phase time metric that measures the amount of time the cyber attack spends in each attack phase of the plurality of attack phases of the cyber attack scenario with the cyber defense; and
evaluate the one or more cyber defenses in accordance with the one or more sets of cyber attack metrics in each of the plurality of attack phases of the cyber attack scenario.

15. The method of claim 1, wherein the attack phases comprise:
a footprint phase, a scanning phase, an enumeration phase, a gain access phase, an escalate privilege phase, and a pilfer phase.

16. The system of claim 14, further comprising a simulator operable to:
simulate the cyber attack operating with no cyber defense; and
determine, prior to the simulation of the cyber attack scenario operating with a cyber defense, a baseline set of cyber attack metrics describing the cyber attack operating with no cyber defense.

17. The system of claim 14, the one or more processors operable to:
identify an effective cyber defense from the one or more cyber defenses in response to the evaluation of the one or more cyber defenses; and
modify a computer network, in response to identification the effective cyber defense, to use the effective cyber defense.

18. The system of claim 14:
the determining the set of cyber attack metrics comprising:
determining a first successful attacks metric that measures the number of successful attacks with a first cyber defense; and
determining a second successful attacks metric that measures the number of successful attacks with a second cyber defense, the first successful attacks indicating that the first cyber defense reduces the number of successful attacks more than the second cyber defense; and
the evaluating the one or more cyber defenses comprising:
determining that the first cyber defense is more effective than the second cyber defense based at least in part on the first successful attack metric and the second successful attack metric.

19. The system of claim 14:
the determining the set of cyber attack metrics comprising:
determining a first duration metric that measures the duration of the cyber attack with a first cyber defense; and
determining a second duration metric that measures the duration of the cyber attack with a second cyber defense, the first duration metric indicating that the first cyber defense is of a greater duration of the cyber attack than that of the second cyber defense; and
the evaluating the one or more cyber defenses comprising:
determining that the first cyber defense is more effective than the second cyber defense based at least in part on a comparison of the first duration metric and the second duration metric.

20. The system of claim 14:
the determining the set of cyber attack metrics comprising:
determining a first attack disruptions metric that measures the number of attack disruptions with a first cyber defense; and
determining a second attack disruptions metric that measures the number of attack disruptions with a second cyber defense; and
the evaluating the one or more cyber defenses comprising:
determining that the first cyber defense is more effective than the second cyber defense based at least in part on a comparison of the first attack disruptions metric and the second attack disruptions metric.

21. The system of claim 14:
the evaluating the one or more cyber defenses comprising:
determining that the first cyber defense is more effective than the second cyber defense based at least in part on a comparison of the phase time metric for the first cyber defense and the phase time metric for the second cyber defense.

22. The system of claim 14:
the determining the set of cyber attack metrics comprising:
determining a first efficiency metric that measures a ratio of how often the cyber attack is disrupted versus how often a defensive action is taken with a first cyber defense; and
determining a second efficiency metric that measures a ratio of how often the cyber attack is disrupted versus how often a defensive action is taken with a second cyber defense, the first efficiency metric indicating that the first cyber defense has a higher ratio than that of the second cyber defense; and
the evaluating the one or more cyber defenses comprising:
determining that the first cyber defense is more effective than the second cyber defense.

23. The system of claim 14, the set of cyber attack metrics comprising:
a utilization metric that measures utilization of one or more resources.

24. The system of claim 14, the set of cyber attack metrics comprising:
an attack noise metric that measures one or more recurring cyber attack operations.

25. The system of claim 14, the set of cyber attack metrics comprising:
a size metric that measures the size of a computer network of the cyber attack scenario.

26. The system of claim 14, wherein the attack phases comprise:
a footprint phase, a scanning phase, an enumeration phase, a gain access phase, an escalate privilege phase, and a pilfer phase.

27. One or more non-transitory computer readable storage media when executed by one or more processors operable to:
receive one or more cyber attack parameters, a cyber attack parameter describing a cyber attack scenario, the cyber attack parameters comprising at least one temporal parameter describing a temporal feature of the cyber attack scenario;
perform the following for each cyber defense of one or more cyber defenses to yield one or more sets of cyber attack metrics:
simulate the cyber attack scenario operating with a cyber defense, the simulation including: simulating a first attack phase of the cyber attack scenario against the cyber defense, and in response to the cyber attack overcoming the first cyber defense, simulating another of the plurality of attack phases of the cyber attack against the cyber defense; and
determine a set of cyber attack metrics describing the cyber attack scenario operating with the cyber defense in each attack phase of the cyber attack scenario, the set of cyber attack metrics including a phase time metric that measures the amount of time the cyber attack spends in each attack phase of the plurality of attack phases of the cyber attack scenario with the cyber defense; and
evaluate the one or more cyber defenses in accordance with the one or more sets of cyber attack metrics in each of the plurality of attack phases of the cyber attack scenario.

28. The media of claim 27, operable to:
identify an effective cyber defense; and
modify a computer network using the effective cyber defense.

29. The media of claim 28, wherein the attack phases comprise:
a footprint phase, a scanning phase, an enumeration phase, a gain access phase, an escalate privilege phase, and a pilfer phase.

* * * * *

UNITED STATES PATENT AND TRADEMARK OFFICE
CERTIFICATE OF CORRECTION

PATENT NO. : 8,516,596 B2  Page 1 of 1
APPLICATION NO. : 13/012888
DATED : August 20, 2013
INVENTOR(S) : Sandoval et al.

It is certified that error appears in the above-identified patent and that said Letters Patent is hereby corrected as shown below:

In the specifications:

In column 4, line 41, after "engine", insert --12--, therefor

In column 5, line 11, after "the", delete "success", therefor

In column 5, line 44, delete "$P_{A,partial}$" and insert --$p_{A,partial}$--, therefor In column 9, line 3, delete "cyber," and insert --cyber--, therefor In the claims:

In column 11, line 49, in Claim 3, after "defense", insert --,--, therefor

In column 16, line 29, in Claim 29, delete "claim 28" and insert --claim 27--, therefor Signed and Sealed this
Twenty-eighth Day of January, 2014

Michelle K. Lee
*Deputy Director of the United States Patent and Trademark Office*